United States Patent
Altmanshofer et al.

(10) Patent No.: US 6,573,944 B1
(45) Date of Patent: Jun. 3, 2003

(54) HORIZONTAL SYNCHRONIZATION FOR DIGITAL TELEVISION RECEIVER

(75) Inventors: Robert Dale Altmanshofer, Carmel, IN (US); Michael Evan Crabb, Carmel, IN (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/562,455

(22) Filed: May 2, 2000

(51) Int. Cl.[7] .................................................. H04N 5/04
(52) U.S. Cl. ...................... 348/542; 348/348; 348/544; 348/540
(58) Field of Search ................................ 348/500, 536, 348/537, 540, 542, 544, 545; H04N 5/04

(56) References Cited

U.S. PATENT DOCUMENTS

| | | |
|---|---|---|
| 4,414,571 A | 11/1983 | Kureha et al. |
| 4,996,596 A * | 2/1991 | Hirao et al. ............... 348/542 |
| 5,289,508 A | 2/1994 | Wada et al. |
| 5,459,756 A | 10/1995 | Stilwell et al. |
| 5,796,392 A | 8/1998 | Eglit |
| 5,907,364 A | 5/1999 | Furuhata et al. |
| 6,028,641 A | 2/2000 | Kim |
| 6,091,304 A | 7/2000 | Harrer |

FOREIGN PATENT DOCUMENTS

| | | |
|---|---|---|
| EP | 0779741 | 6/1997 |
| WO | 99/16243 | 4/1999 |

OTHER PUBLICATIONS

Copy of EPO Search Report.
Fairchild Semiconductor Nov. 1983 CD4051BC CD4052BC CD4053BC Single 8–Channel Analog Multiplexer/Demultiplexer Dual 4–Channel Analog Multiplexer/Demultiplexer Triple 2–Channel Analog Multiplexer/Demultiplexer.

* cited by examiner

Primary Examiner—Sherrie Hsia
(74) Attorney, Agent, or Firm—Joseph S. Tripoli; Joseph J. Laks; Harvey D. Fried

(57) ABSTRACT

A horizontal synchronizing system, comprising: a source of a horizontal synchronizing signal; a source of first and second higher frequency horizontal drive signals; a phase detector for generating a first control voltage responsive to the horizontal synchronizing signal and the first horizontal drive signal; a source of a second control signal; and, a switch for selectively supplying the first control signal to the source of the drive signals for a phase-locked mode of operation at the first higher frequency and supplying the second control signal to the source of the drive signals for a phase-unlocked mode of operation at the second higher frequency.

16 Claims, 4 Drawing Sheets

HORIZONTAL SYNCHRONIZATION FOR DIGITAL TELEVISION RECEIVER

BACKGROUND OF THE INVENTION

This invention relates to the field of horizontal synchronization in digital television receivers.

Analog video signals have a horizontal synchronizing and scanning frequency of approximately 15.735 KHz in the NTSC system. This synchronizing and scanning frequency is different in the PAL and SECAM systems, but is generally comparable. Irrespective of the system, this is generally referred to as a standard horizontal synchronizing and scanning frequency, often denoted as fH or 1 fH. Television receivers providing progressive scanning rather than interlaced scanning operate at twice the standard synchronizing frequency, approximately 31.47 KHz in NTSC, often denoted as 2 fH. Such television receivers upconvert the analog video input using digital circuits that double the number of horizontal lines per field, either by repeating each line or by interpolation. A phase detector is utilized to synchronize the 2 fH deflection circuit with the 1 fH input video signal.

Digital television receivers, for example those designed to process video signals in the MPEG2 format, can have horizontal synchronization circuits operating at 2.14 fH, approximately 33.75 KHz. The circuits for processing an MPEG2 signal include a time base correction function that obviates the need for a phase detector. Instead, a binary rate multiplier responsive to a microprocessor controls an oscillator, which in turn drives a number of counters that divide the oscillator output down to the desired horizontal drive frequency. The upconverted video data is written into and read from a memory in such a way that time base correction is provided.

It was thought that in a digital television receiver operating at 2.14 fH, standard 1 fH video could simply be upconverted to 2.14 fH instead of 2 fH; and indeed, the upconversion presented no special difficulties. However, a number of unanticipated problems were encountered when displaying the upconverted video at 2.14 fH. One of the problems encountered stemmed from the coupling of the deflection voltages and currents into the 1 fH NTSC signal paths into the television receiver, for example from the antenna, from a video cassette recorder and from a DVD player. This is similar to signal pickup or coupling that can happen internally to the television receiver, for example by ground loops on circuit boards. The third wire ground of the television receiver or of the externally connected components can also contribute to this signal pickup. Under this condition the 2.14 H deflection currents and/or voltages are asynchronous with respect to the input NTSC signal being displayed and the coupled signal appears in the scanned raster as an interference similar to horizontal bars.

It was found that this effect can be reduced by operating the deflection circuit at 2 fH instead of 2.14 fH. Under this condition the coupled interference is reduced in visibility but is still present and can be seen in the raster as vertical bars moving horizontally, similar to horizontal shading except that the moving bars are not locked to scan. The unwanted coupled signal is moving because the upconversion process does not maintain the horizontal phase relationship of the display section output to the incoming NTSC signal. While the upconverted NTSC is close in frequency to the 2 fH scanned raster these signals are not at the identical frequency and they are not synchronized in phase.

Accordingly, a solution was needed that would enable a digital television receiver to display digital video signals, for example in MPEG2 format, at 2.14 fH and to display standard video signals, for example NTSC, in an upconverted, progressively scanned format.

The visibility of the interference due to upconverted scanning even at 2 fH, instead of 2.14 fH, can be further reduced by phase/frequency locking the 2 fH deflection to the incoming 1 fH signal. This reduces any deflection generated coupled signal to stationary interference on the raster display. In accordance with this solution the 1 fH synchronizing/drive signal obtained from the 1 fH video input signal is compared to the 2 fH deflection drive pulse in a phase detector. The output of the phase detector is then used to control the frequency of a voltage controlled oscillator. The display pixel clock for the MPEG2 video signal is derived from the VCO, and accordingly, controlling its frequency permits closing the phase locked loop to bring the 2 fH deflection in phase/frequency lock with the 1 fH NTSC input horizontal synchronizing component.

However, this solution posed a further problem of needing to operate the television receiver at two different horizontal scanning frequencies for different kinds of video input signals, for example digital video signals in MPEG2 format at 2.14 fH and analog video signals in NTSC, PAL or SECAM format at 2 fH.

SUMMARY OF THE INVENTION

A horizontal synchronizing system in accordance with the inventive arrangements, that solves the problems faced by the prior art, comprises: a source of a horizontal synchronizing signal; a source of first and second higher frequency horizontal drive signals; a source of a first control voltage; a source of a second control signal; and, said source of said drive signals having a phase-locked mode of operation at said first higher frequency responsive to said first control signal and a phase-unlocked mode of operation at said second higher frequency responsive to said second control signal.

The system can further comprise means for phase locking said first drive signal with said source of said horizontal synchronizing signal.

The source of said drive signals can comprises a controllable oscillator.

The oscillator can advantageously operate at the same frequency responsive to both said first and second control signals.

The source of said drive signals can advantageously further comprise counters clocked by the oscillator and supplying different numbers of samples during blanking at said first and second higher frequencies respectively.

Another horizontal synchronizing system in accordance with the inventive arrangements, that solves the problems faced by the prior art, comprises: a source of a horizontal synchronizing signal; a source of first and second higher frequency horizontal drive signals; a phase detector for generating a first control voltage responsive to said horizontal synchronizing signal and said first horizontal drive signal; a source of a second control signal; and, a switch for selectively supplying said first control signal to said source of said drive signals for a phase-locked mode of operation at said first higher frequency and supplying said second control signal to said source of said drive signals for a phase-unlocked mode of operation at said second higher frequency.

The source of the drive signals can comprise: a voltage controlled oscillator; and, counters for supplying different numbers of samples during blanking at said first and second higher frequencies respectively.

The source of said second control signal can comprise: a binary rate multiplier; and, a binary rate multiplier filter.

The system can advantageously further comprise a circuit responsive to said drive signals for and generating a pulse width stretched timing signal as an input to said phase detector, in order to control the response speed of the phase locked loop.

A horizontal synchronizing system in accordance with a presently preferred embodiment comprises: a source of an fH horizontal synchronizing signal; a source of nfH and mfH horizontal drive signals, where $n \geq 2$, $m \geq 2$ and n is an integer; a phase detector for generating a first control signal responsive to said fH horizontal synchronizing signal and said nfH horizontal drive signal; a source of a second control signal; and, a switch for selectively supplying said first control signal to said source of said drive signals for a phase-locked mode of operation at nfH and supplying said second control signal to said source of said drive signals for a phase-unlocked mode of operation at mfH. The factor n can be equal to 2 and the factor m can be equal to 2.14.

The source of said drive signals can comprise: a voltage controlled oscillator; and, counters for changing the number of samples during blanking at said nfH and mfH frequencies.

DETAILED DESCRIPTION OF THE PREFERRED EMBODIMENTS

Figure 1:
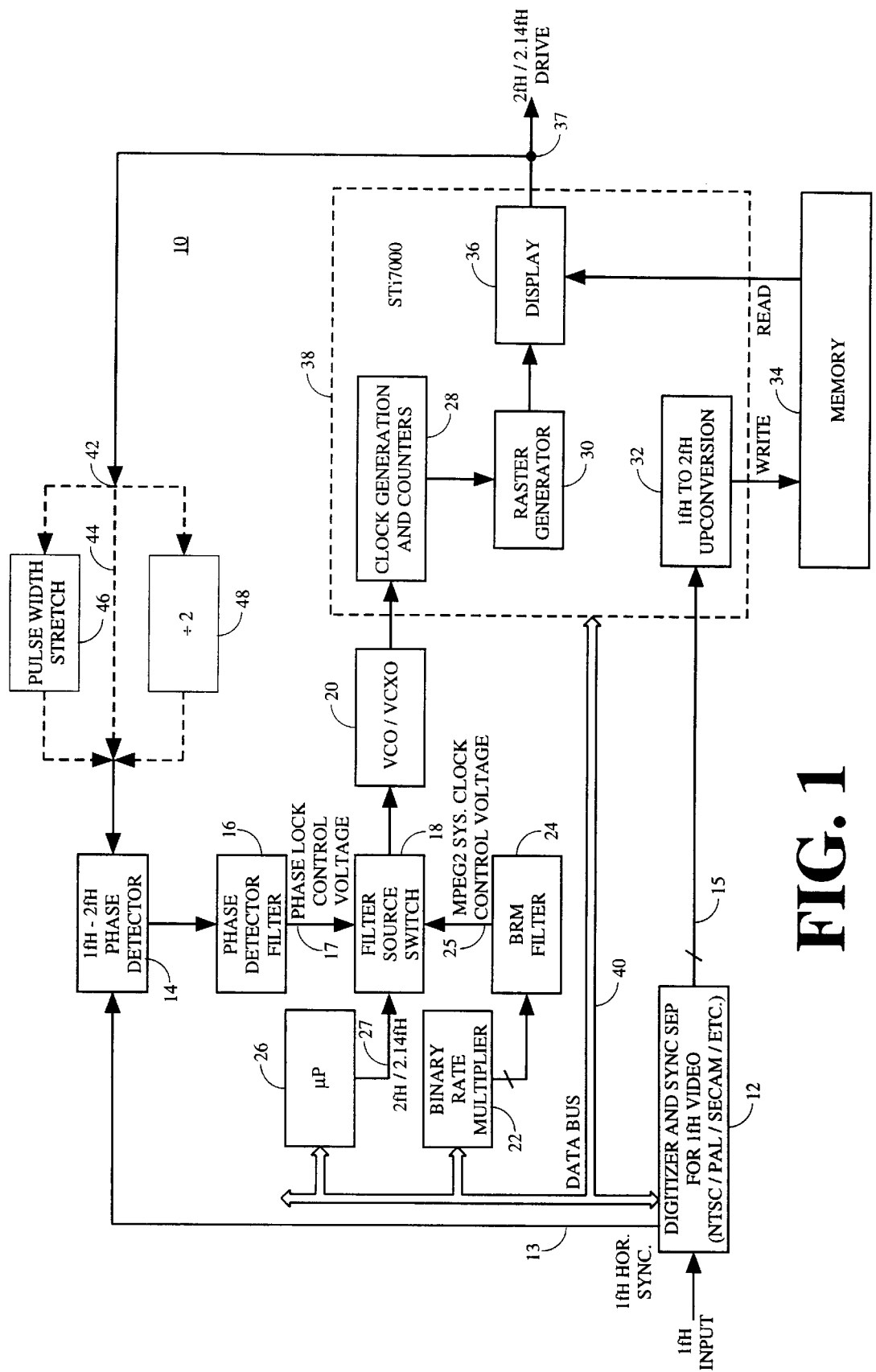
FIG. 1 is a block diagram of a multiple frequency horizontal synchronizing system in accordance with the inventive arrangements.

A block diagram of a multiple frequency horizontal synchronizing system 10 in accordance with the inventive arrangements is shown in FIG. 1. The system has selectable modes of operation including an open loop and a closed loop control path for an oscillator 20. Oscillator 20 can, for example, be a voltage controlled oscillator (VCO) or a voltage controlled crystal oscillator (VCXO). Open loop control is used for displaying digital video signals, for example in MPEG2 format. The oscillator 20 operates at 13.5 MHz, which is then doubled to 27 MHz and used as the reference for an 81 MHz pixel display clock and the MPEG2 system clock.

The open loop control path begins with a microprocessor ($\mu$P) 26 that supplies a digital frequency control value to a binary rate multiplier (BRM) 22 over a data bus 40. The digital frequency control value is converted to an MPEG2 system clock control voltage by a BRM filter 24. The output of BRM filter 24 on line 25 is a first input to a filter source switch 18. The MPEG2 system clock control voltage is supplied to the oscillator 20 from filter source switch 18 responsive to a 2 fH/2.14 fH selection signal generated by the microprocessor 27. The BRM filter input represents the control signal used for 2.14 fH deflection. The selection signal is illustrated as a direct wire connection, but selection control can also be implemented by the data bus 40 or by a serial data and control bus of the kind having SDA and SCL signals, not shown.

A clock generation and counters circuit 28 is responsive to the output of the oscillator 20. A raster generator 30 is responsive to the clock generation and counters circuit 28, and in turn, drives a display circuit 36. The display circuit generates a 2.14 fH drive signal 37. In the presently preferred embodiment, circuits 28, 30 and 36 are embodied in an Sti7000 integrated circuit 38 available from ST Microelectronics.

The closed loop path includes a phase detector 14. A standard 1 fH analog video signal, for example NTSC, PAL or SECAM, is an input to a digitizer and synchronizing signal separator 12. A 1 fH synchronizing signal is a first input to the phase detector 14. The drive signal generated by the display circuit 36 is fed back as a second input to the phase detector 14. The feedback path includes a branch point 42 that illustrates three different embodiments. In one embodiment path 44 leads directly to the phase detector without any modification of the drive signal. In this case, the phase detector compares the phase of every 1 fH synchronizing pulse with every other pulse of the drive signal. In the case of a 1 fH input video signal, the drive signal will have a frequency of 2 fH. In a second embodiment represented by pulse width stretch circuit 46, the drive pulses are stretched, for example from a width of approximately 1 $\mu$sec to approximately 9 $\mu$sec. In a third embodiment represented by divider circuit 48, the drive signal is divided by two. The embodiments represented by circuits 46 and 48 enable the resulting phase locked loop to operate with a faster response time than when direct path 44 is utilized.

The output of the phase detector is integrated by a phase detector filter 16. The integrated output is a phase lock control voltage supplied as a second input to filter source switch 18 over line 17. The phase detector filter input represents the control signal used for 2 fH deflection.

The analog video that has been processed by digitizer 12 is supplied on lines 15 to a 1 fH to 2 fH upconversion circuit 32. The upconversion can be accomplished by doubling the number of horizontal lines, as the digitized video is read out from a memory 34. Alternatively, the upconversion can be accomplished by interpolation. The upconverted video signal is read from the memory 34 into the display circuit 36, and then supplied as a video output signal (VIDEO OUT). The upconversion circuit 32 can also be a part of the Sti7000 integrated circuit.

During operation at 2.14 fH there will be a 2.14 fH input to the phase detector 14, and there may be a 1 fH synchronizing signal also applied to the phase detector 14, even if the 1 fH signal is not selected for display. However, the filter source switch will at that time be supplying the MPEG2 system clock control voltage to the oscillator and the output of the phase detector 16, if any, will be effectively ignored.

When the system supplies the 2 fH drive signal instead of the 2.14 fH drive signal the oscillator operates at the same clock frequency. Instead of changing the oscillator frequency, the operation of the clock generation and counters circuit 28 is modified to change the number of samples during blanking. The significant difference is that the 2 fH drive signal and the 1 fH input signal are phase locked, thus eliminating, or at least substantially eliminating the noise problem resulting from unlocked operation.

Figure 2:
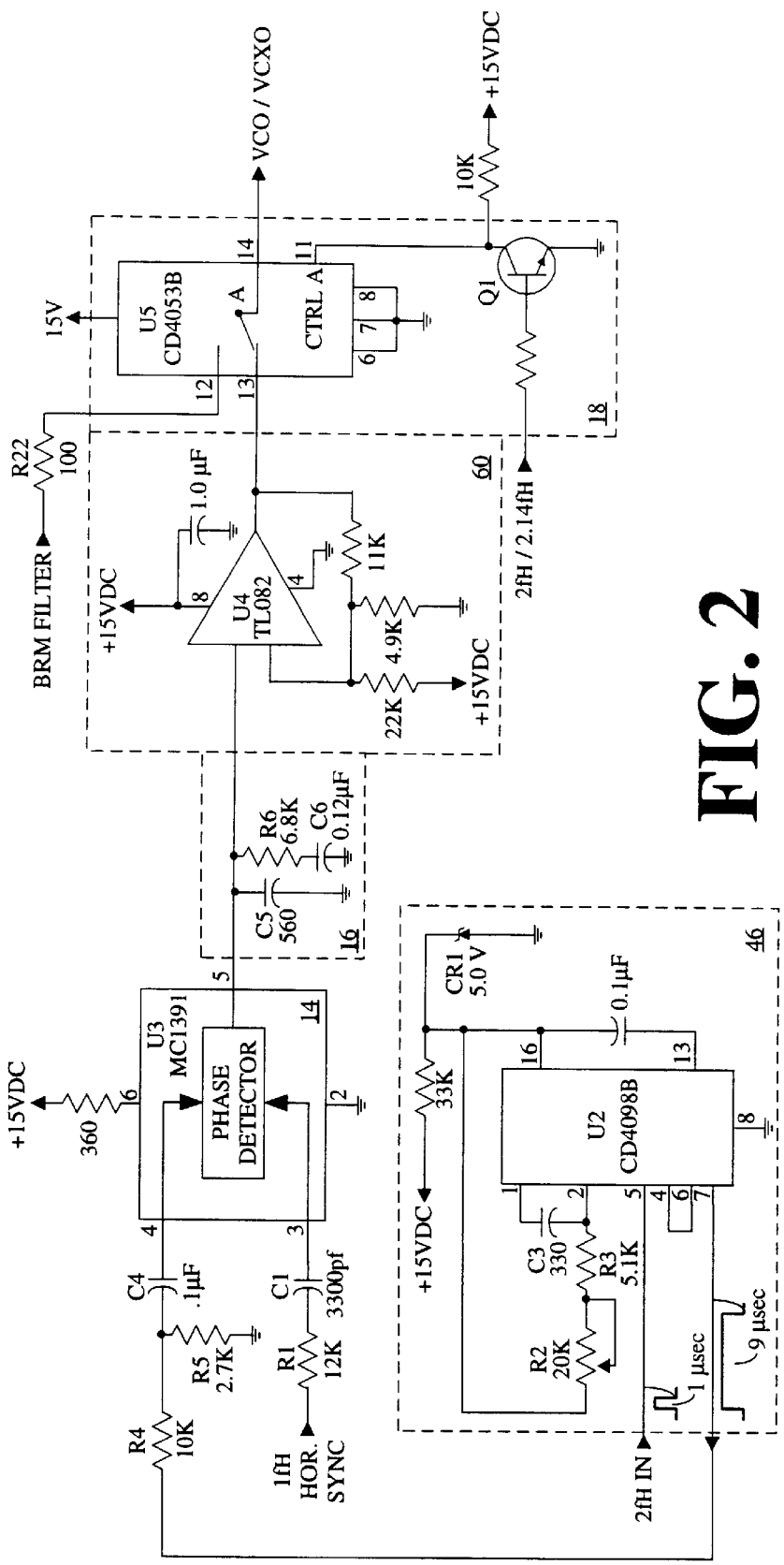
FIG. 2 is a schematic diagram of a first embodiment for implementing the synchronizing system shown in FIG. 1.

FIG. 2 illustrates a first set of embodiments for implementing various parts of the system 10 shown in FIG. 1. Pulse width stretching circuit 46 can be embodied as a CD4098 integrated circuit U2, a CMOS dual one-shot. The one-shot utilizes an external timing circuit formed by capacitor C3 and resistors R2 and R3 to stretch the 2 fH drive pulse from a 1 $\mu$sec duration to a 9 $\mu$sec duration.

The phase detector 14 can be implemented by a MC1391 integrated circuit U3, a television horizontal processor including a phase detector. The output of the one-shot U2 is filtered by resistors R4 and R5 and capacitor C4 and then applied to pin 4 of U3. The 1 fH horizontal synchronizing signal is filtered by resistor R1 and capacitor C1 and applied to pin 3 of U3. The output of the phase detector is applied to a phase detector filter 16, which is embodied as an integrator formed by capacitors C5 and C6 and resistor R6. The voltage on the output of the integrator is then fed to a voltage scaler 60, embodied as a TL082 operational-amplifier U4, where the voltage is scaled to match the range to the VCO/VCXO 20. The filter source switch 18 can be embodied as CD4053B analog multiplexer integrated circuit U5. One input contact of a switch A is coupled to the output of the op-amp U4 on pin 13. The other input contact of switch A is coupled to the BRM filter 24, through resistor R22, on pin 13 of U5. A switch embodied by transistor Q1 controls the voltage on pin 11 of U5 responsive to the 2 fH/2.14 fH control signal, thus controlling the operation of switch A. Switch A selects either the BRM filter or the phase detector filter as the control source for the oscillator 20, for operation at 2.14 fH and 2 fH respectively.

Figure 3:
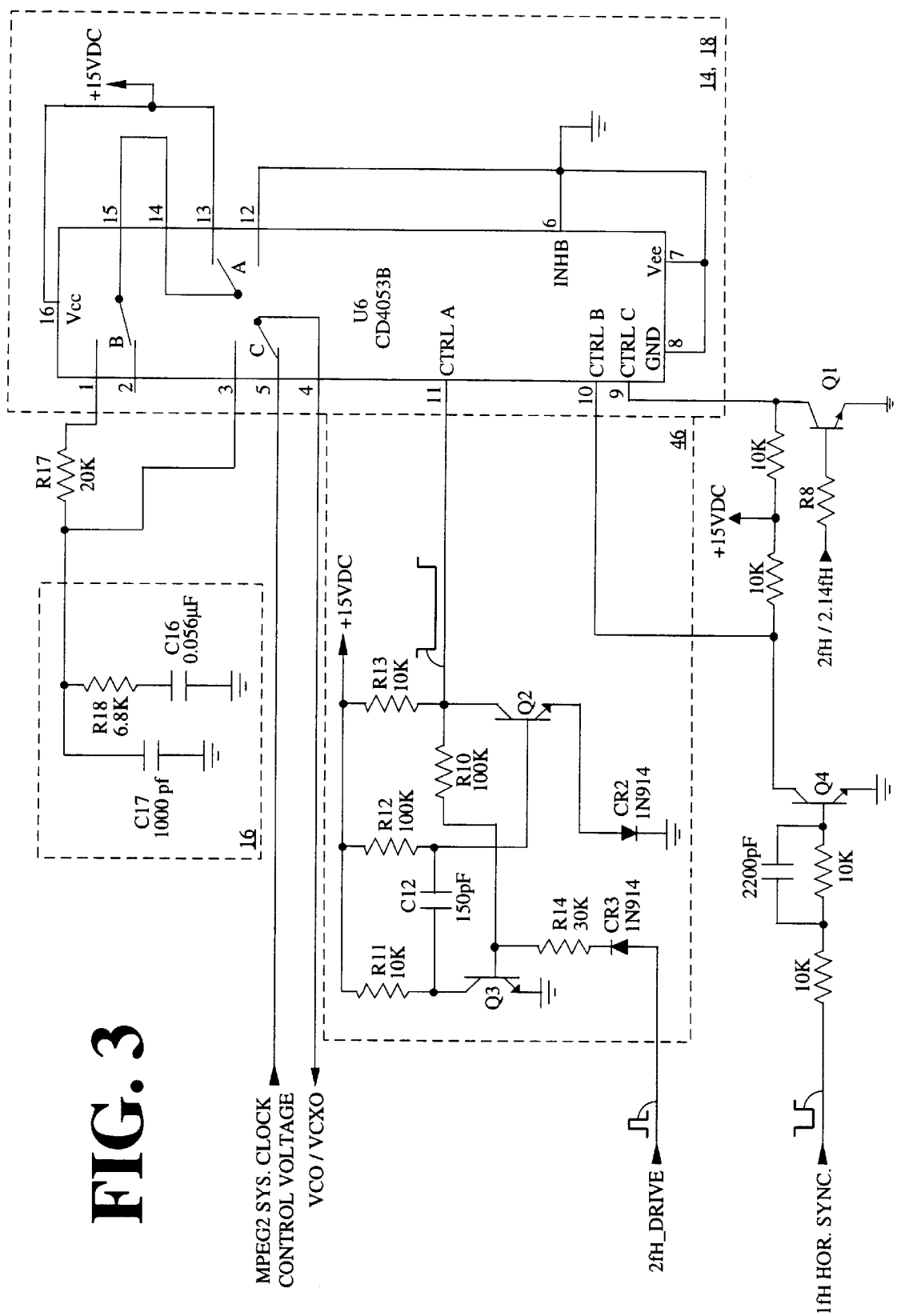
FIG. 3 is a schematic diagram of a second embodiment for implementing the synchronizing system shown in FIG. 1.

FIG. 3 illustrates a second set of embodiments for implementing various parts of the system 10 shown in FIG. 1. The embodiment of FIG. 3 is particularly useful for a VCXO oscillator, which uses varactors to control frequency. This embodiment advantageously combines the phase detector and scaler of FIG. 2, thus reducing the number of components, by having the output of the phase detector directly generate the range of 0 to 15 volts required for the VCXO varactors. In this approach the phase detector 14 is embodied in a CD4053B analog multiplexer U6, in which switch A is switched between +15 volts on pin 13 and ground on pin 12 at a 2 fH rate based on the deflection. The pulse width stretch circuit 46 in FIG. 3 is embodied by a component one-shot circuit formed by transistors Q2 and Q3. The values of resistors R10, R11, R12, R13 and R14 are chosen to provide an approximately 9 μsec output pulse responsive to an approximately 1 μsec input pulse, as in FIG. 2. It will be appreciated that the embodiments of the pulse width stretch circuit 46 shown in FIGS. 2 and 3 are interchangeable. The 2 fH rate control for switch A is the width-extended 2 fH drive pulse applied to pin 11.

Switch B is controlled by transistor Q4 responsive to the 1 fH synchronizing component. The output of switch B is coupled from pin 1 to the phase detector filter 16, embodied by capacitors C16 and C17 and resistor R18. The integrated voltage is coupled to one input of switch C on pin 3. The BRM filter output is coupled to the other input of switch C on pin 5. Switch C switches the voltage applied to the VCXO varactors between the phase detector output for 1 fH video signal upconversion operation and the BRM output used in normal MPEG2 decoding. In this approach the magnitudes of the phase detector filter charge and discharge currents are primarily determined by the value of resistor R17, presently 20 K. In the locked condition the average value of the charge and discharge currents are equal.

Figure 4:
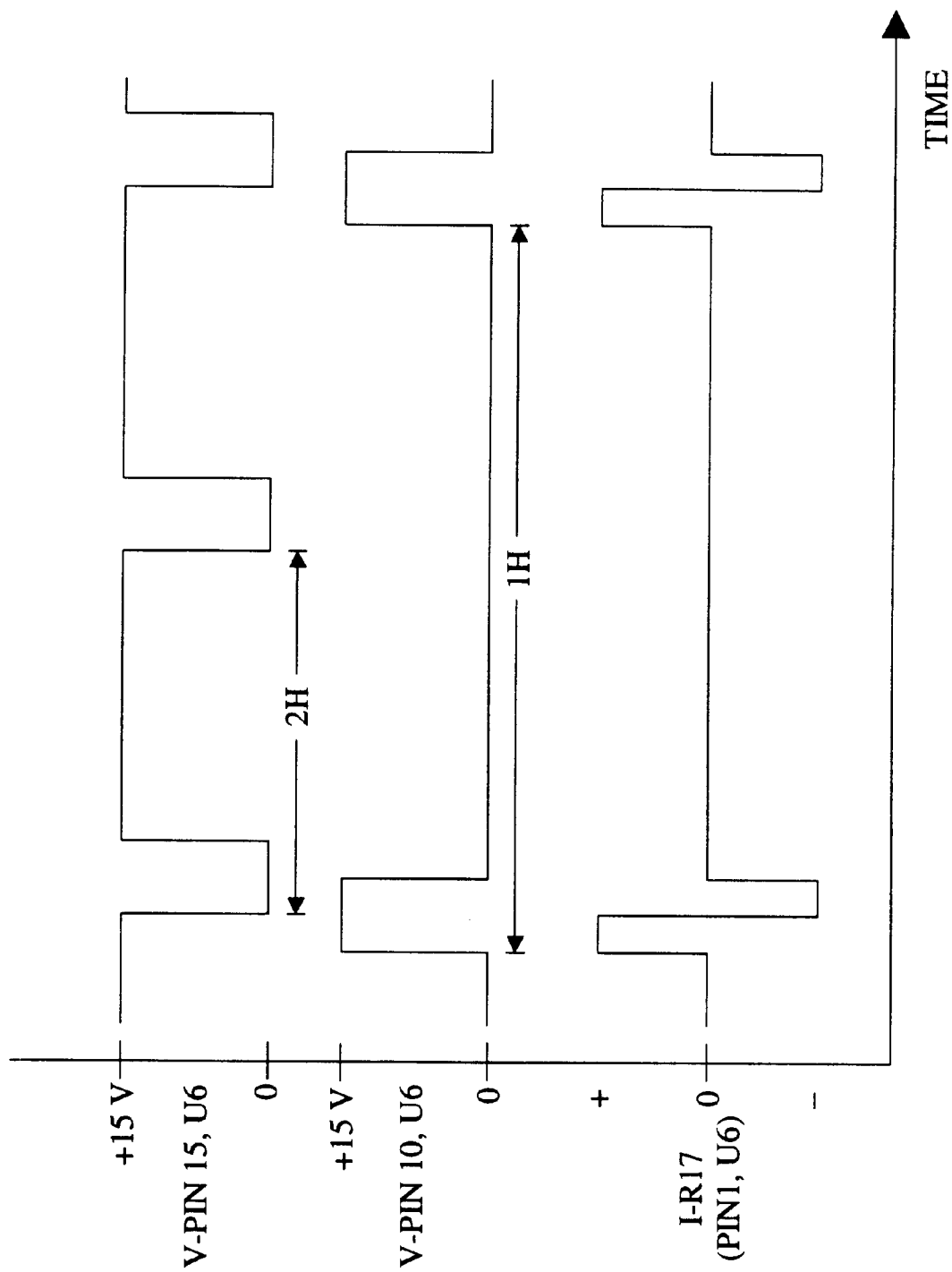
FIG. 4 illustrates waveforms useful for explaining operation of the phase detector in FIG. 3.

FIG. 4 illustrates the voltage at pin 15, the voltage at pin 10 and the current at through resistor R17, which is also the current at pin 1. It can be seen that the 1 fH signal on pin 10 samples every other pulse of the 2 fH signal on pin 15, thus causing the positive and negative currents at resistor R17/pin 1. More particularly, when the pulses of the 1 fH signal occur, the integrator is charged or discharged. When the 1 fH pulses do not occur, the input to the integrator floats. The integrated current at pin 3 need not be scaled to drive the varactors of a VCXO.

What is claimed is:
1. A horizontal synchronizing system, comprising:
   a source of a horizontal synchronizing signal;
   a source of first and second higher frequency horizontal drive signals;
   a phase detector for generating a first control signal responsive to said horizontal synchronizing signal and said first horizontal drive signal;
   a source of a second control signal; and,
   a switch for selectively supplying said first control signal to said source of said drive signals for a phase-locked mode of operation at said first higher frequency and supplying said second control signal to said source of said drive signals for a phase-unlocked mode of operation at said second higher frequency.
2. The system of claim 1, wherein said source of said drive signals comprises:
   a voltage controlled oscillator; and, counters for supplying different numbers of samples during blanking at said first and second higher frequencies respectively.
3. The system of clam 1, wherein said source of said second control signal comprises:
   a binary rate multiplier; and,
   a binary rate multiplier filter.
4. The system of claim 2, wherein said oscillator comprises a crystal oscillator.
5. The system of claim 1, further comprising a circuit responsive to said drive signals for generating a pulse width stretched timing signal as an input to said phase detector.
6. The system of claim 5, wherein said circuit responsive to said drive signals comprises a one-shot.
7. The system of claim 1, wherein said phase detector comprises a multiplexer.
8. The system of claim 7, wherein said multiplexer comprises:
   a first switch having inputs coupled across a potential and generating pulses at said first higher frequency as an output responsive to said first drive signal;
   a second switch having an input coupled for sampling said first higher frequency output pulses responsive to said horizontal synchronizing signal;
   an integrator for developing said first control signal responsive to said sampled pulses; and,
   a third switch having said first and second control signals coupled to respective input contacts and having an output coupled to said source of said drive signals.
9. A horizontal synchronizing system, comprising:
   a source of an fH horizontal synchronizing signal;
   a source of nfH and mfH horizontal drive signals, where n≧2, m≧2 and n is an integer;
   a phase detector for generating a first control signal responsive to said fH horizontal synchronizing signal and said nfH horizontal drive signal;
   a source of a second control signal; and,
   a switch for selectively supplying said first control signal to said source of said drive signals for a phase-locked mode of operation at nfH and supplying said second control signal to said source of said drive signals for a phase-unlocked mode of operation at mfH.
10. The system of claim 9, wherein said source of said drive signals comprises:
   a voltage controlled oscillator; and,
   counters for changing the number of samples during blanking at said nfH and mfH frequencies.
11. The system of claim 9, wherein n=2 and m=2.14.
12. A horizontal synchronizing system, comprising:
   a source of a horizontal synchronizing signal;

a source of first and second higher frequency horizontal drive signals;

a source of a first control signal;

a source of a second control signal; and, said source of said drive signals having a phase-locked mode of operation at said first higher frequency responsive to said first control signal and a phase-unlocked mode of operation at said second higher frequency responsive to said second control signal.

13. The system of claim 12, further comprising means for phase locking said first drive signal with said source of said horizontal synchronizing signal.

14. The system of claim 12, wherein said source of said drive signals comprises a controllable oscillator.

15. The system of claim 14, wherein said oscillator operates at the same frequency responsive to both said first and second control signals.

16. The system of claim 14, wherein said source of said drive signals further comprises counters clocked by said oscillator and supplying different numbers of samples during blanking at said first and second higher frequencies respectively.

* * * * *